United States Patent
Chen et al.

(10) Patent No.: US 9,113,529 B2
(45) Date of Patent: Aug. 18, 2015

(54) REMOTE INTELLIGENT MONITORING SYSTEM AND LED STREET LAMP APPLIED THERETO

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Te-Sheng Chen, New Taipei (TW); Xiao-Guang Li, Shenzhen (CN); Kuan-Hong Hsieh, New Taipei (TW); Yun Xiao, Shenzhen (CN); Shang-Hui Pi, Shenzhen (CN); Shuang Rui, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 200 days.

(21) Appl. No.: 13/951,480

(22) Filed: Jul. 26, 2013

(65) Prior Publication Data
US 2014/0028219 A1     Jan. 30, 2014

(30) Foreign Application Priority Data

Jul. 26, 2012  (CN) .......................... 2012 1 0261282

(51) Int. Cl.
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC .......... *H05B 33/0848* (2013.01); *H05B 33/089* (2013.01); *H05B 33/0854* (2013.01); *Y02B 20/72* (2013.01)

(58) Field of Classification Search
USPC .......................................... 315/294, 297, 301
See application file for complete search history.

(56) References Cited

U.S. PATENT DOCUMENTS

| 8,754,589 | B2 * | 6/2014 | Chemel et al. ................ 315/297 |
| 8,805,550 | B2 * | 8/2014 | Chemel et al. .................. 700/22 |
| 8,823,277 | B2 * | 9/2014 | Chemel et al. ................ 315/291 |
| 8,841,859 | B2 * | 9/2014 | Chemel et al. ................ 315/294 |

(Continued)

FOREIGN PATENT DOCUMENTS

| CN | 201925842 U | 8/2011 |
| CN | 202043346 U | 11/2011 |

(Continued)

*Primary Examiner* — Adam Houston
(74) *Attorney, Agent, or Firm* — Novak Druce Connolly Bove + Quigg LLP (57) ABSTRACT

A remote intelligent monitoring system includes a server and a plurality of LED street lamps. Each of the plurality of LED street lamps includes a plurality of LED light sources connected in parallel, a detecting module and a sensing module. The detecting module detects the functioning of each LED light source, and the sensing module detects atmospheric information of the area where the LED street lamp is located. If the detected functioning is not consistent with specified electrical standards corresponding to the detected atmospheric information, either the server or the LED street lamp itself can adjust the electrical functioning of the LED light sources to accord with the specified standards.

13 Claims, 6 Drawing Sheets

(56) References Cited

U.S. PATENT DOCUMENTS

| | | | |
|---|---|---|---|
| 8,954,170 B2* | 2/2015 | Chemel et al. | 700/19 |
| 2002/0043943 A1* | 4/2002 | Menzer et al. | 315/291 |
| 2005/0062433 A1* | 3/2005 | Ongaro | 315/209 PZ |
| 2007/0035255 A1* | 2/2007 | Shuster et al. | 315/200 R |
| 2010/0117545 A1* | 5/2010 | Kelly et al. | 315/152 |
| 2012/0038281 A1* | 2/2012 | Verfuerth | 315/152 |
| 2012/0083044 A1* | 4/2012 | Sturman et al. | 436/165 |
| 2013/0063032 A1* | 3/2013 | Nevins et al. | 315/115 |
| 2013/0200807 A1* | 8/2013 | Mohan et al. | 315/151 |
| 2013/0257292 A1* | 10/2013 | Verfuerth et al. | 315/153 |
| 2014/0320025 A1* | 10/2014 | Assoulin | 315/154 |
| 2014/0375206 A1* | 12/2014 | Holland et al. | 315/86 |
| 2015/0042462 A1* | 2/2015 | Blackmer et al. | 340/438 |
| 2015/0048754 A1* | 2/2015 | Davies et al. | 315/291 |
| 2015/0084511 A1* | 3/2015 | McRae | 315/122 |
| 2015/0084520 A1* | 3/2015 | Reed | 315/152 |
| 2015/0091451 A1* | 4/2015 | Williams | 315/160 |
| 2015/0091474 A1* | 4/2015 | Hall et al. | 315/297 |

FOREIGN PATENT DOCUMENTS

| | | |
|---|---|---|
| CN | 102287742 A | 12/2011 |
| CN | 202353864 U | 7/2012 |

* cited by examiner

REMOTE INTELLIGENT MONITORING SYSTEM AND LED STREET LAMP APPLIED THERETO

BACKGROUND

1. Technical Field

The present disclosure relates to street lamp monitoring systems, and particularly to an LED (light emitting diode) street lamp and a remote intelligent monitoring system for monitoring and controlling the LED street lamp.

2. Description of Related Art

Street lamps are a public facility in cities. However, monitoring street lamps, such as checking functional defects in street lamps, has not been properly resolved. Although the monitoring can be easily automated, it proves to be difficult to identify the defects precisely, and to localize the malfunctioning lamps with the aim of programming repair. This difficulty is furthermore considerably increased with the number of the street lamps and the monitoring zones increase.

Therefore, there is a need to improve the monitoring systems to make them more efficient and environmentally friendly.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
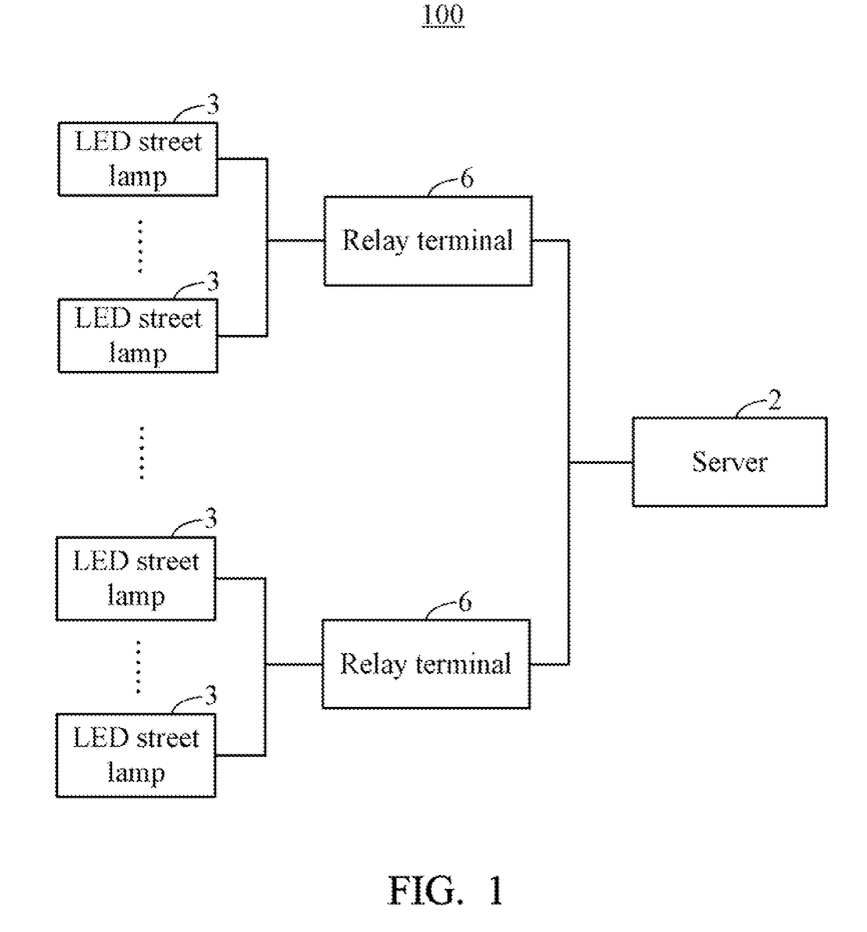
FIG. 1 is a block diagram of a remote intelligent monitoring system, according to an embodiment, and the system includes a server and a number of LED street lamps.

Referring to FIG. 1, a remote intelligent monitoring system 100 for monitoring and controlling LED street lamps is provided. The monitoring system 100 includes a server 2 and a number of LED street lamps 3.

In the embodiment, the LED street lamps 3 each communicate with the server 2 via wired technology, wireless technology, or the combination of wired technology and wireless technology. For example, the LED street lamps 3 transmit data to a relay terminal 6 via Power Line Communication (PLC), Optical Fiber Power Line Communication (OPLC), ZIGBEE, or WIFI technologies. And then the relay terminal 6 receives and transmits the data to the server 2 via Internet, 3G, 4G, GPRS, CDMA, or GSM mobile network technologies. For another example, the LED street lamps 3 transmit data directly to the server 2 via Internet, 3G, 4G, GPRS, CDMA, or GSM mobile network technologies.

Figure 2:
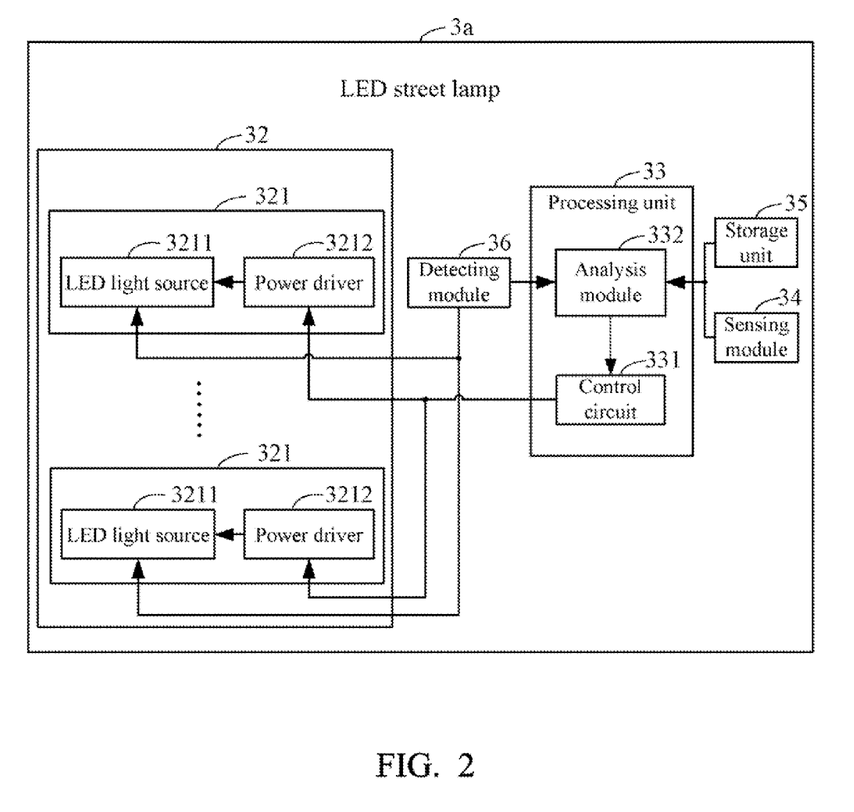
FIG. 2 is a block diagram of the LED street lamp of FIG. 1 according to a first embodiment.

In a first embodiment of the LED street lamp 3a, as shown in FIG. 2, each LED street lamp 3a includes a lamp board group 32, a processing unit 33, a sensing module 34 and a detecting module 36. The lamp board group 32 includes a number of lamp boards 321 connected in parallel. An LED light source 3211 and a power driver 3212 are distributed on each of the lamp boards 321. The LED light source 3211 includes a number of light emitting diodes connected in series. The power driver 3212 receives electrical power from an external source (not shown), and converts the power to a proper direct current (DC) supply, to drive the LED light source 3211 to emit light.

The sensing module 34 includes many types of environmental sensors (not shown) configured to detect atmospheric information of the area where the LED street lamp 3a is located. In this embodiment, the atmospheric information include, but are not limited to, radiation from the sun, humidity, air pressure, wind speed, or air quality.

The detecting module 36 is connected to each LED light source 3211. The detecting module 36 detects the electrical characteristics of each LED light source 3211. In this embodiment, the electrical characteristics include, but are not limited to, the amount of current flowing through each LED light source 3211 or the voltage applied to each LED light source 3211.

In this embodiment, the LED street lamp 3a further includes a storage unit 35 configured to store many kinds of atmospheric conditions and many specified electrical standards corresponding to each of the atmospheric conditions.

The processing unit 33 includes a control circuit 331 and an analysis module 332. The analysis module 332 is connected to the detecting module 36, the sensing module 34 and the storage unit 35, and receives the detected electrical characteristics from the detecting module 36 and the detected atmospheric information from the sensing module 34. The analysis module 332 reads the specified electrical standards corresponding to the detected atmospheric information from the storage unit 35, and determines whether the detected electrical characteristics are consistent with the specified electrical standards. If the detected electrical characteristics are not consistent with the specified electrical standards, the analysis module 332 is further configured to generate a control command including the specified electrical standards.

The control circuit 331 is connected to each one of the power drivers 3212 and the analysis module 332, and adjusts the electrical characteristics of the LED light sources 3211 to accord with the specified electrical standards via the power drivers 3212, in response to the control commands, so as to control the functioning of the LED light sources 3211, for example, switching on or switching off any one of the LED light sources 3211, or adjusting the luminance or a color temperature of the light emitted by any one of the LED light sources 3211.

In this way, the LED street lamp 3a is able to function directly and automatically in a stand-alone mode, without the intervention of the server 2. Such that, when the server 2 fails to work, the LED street lamp 3a takes control to switch itself on or off, or adjust its own luminance or color temperature.

Figure 3:
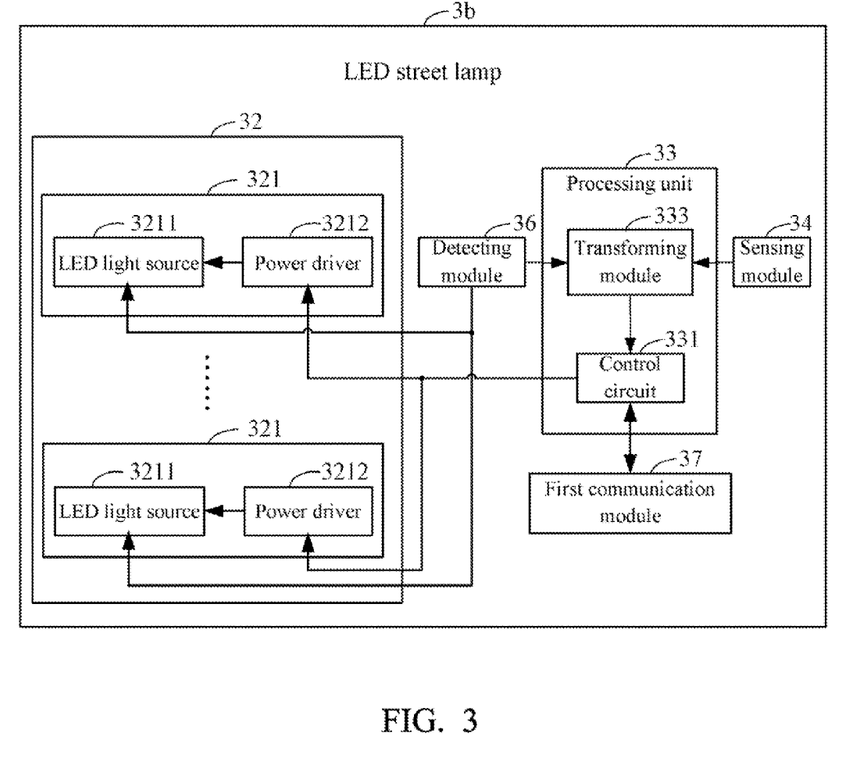
FIG. 3 is a block diagram of the LED street lamp of FIG. 1 according to a second embodiment.

In a second embodiment of the LED street lamp 3b, as shown in FIG. 3, a difference of this embodiment from the first embodiment is that the LED street lamp 3b further includes a first communication module 37, and the processing unit 33 includes the control circuit 331 and a transforming module 333.

In this embodiment, each LED street lamp 3b is provided with a unique identification code so that it can be uniquely identified by the server 2.

The transforming module 333 is connected to the detecting module 36 and the sensing module 34, and receives the detected electrical characteristics from the detecting module 36 and the detected atmospheric information from the sensing module 34. The transforming module 333 is configured to packetize the unique identification code and the detected electrical characteristics of the LED street lamp 3b, and the atmospheric information detected by the sensing module 34 of the LED street lamp 3b together, to generate a detecting signal.

The first communication module 37 receives and sends the detecting signal to the server 2 for analysis. The first communication module 37 is further configured to receive control commands from the server 2, and the control circuit 331 executes the control commands. The control commands may be to switch on or switch off the LED street lamp 3b, or to adjust the luminance or color temperature of the light emitted by the LED street lamp 3b.

Figure 4:
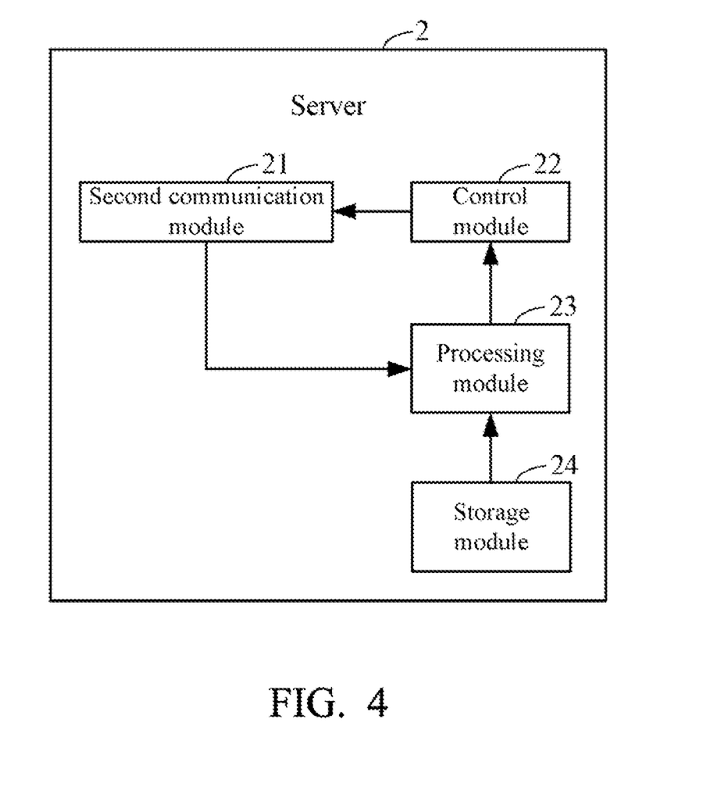
FIG. 4 is a block diagram of the server of FIG. 1.

Referring to FIG. 4, the server 2 includes a second communication module 21, a control module 22, a processing module 23 and a storage module 24. The second communication module 21 receives the detecting signal from each LED street lamp 3b.

In this embodiment, the first communication module 37 communicates with the second communication module 21 via wired technology, wireless technology, or a combination of wired technology and wireless technology.

The processing module 23 is configured to parse the detecting signal to obtain the unique identification code and the detected electrical characteristics of the LED street lamp 3b, and the atmospheric information detected by the LED street lamp 3b.

In this embodiment, the storage 24 stores a normal value interval of electrical standards under normal conditions. The processing module 23 is further configured to determine the functioning of the LED lamps 3b by determining whether the detected electrical characteristics in the detecting signals is in the normal values interval of the electrical standards. If the detected electrical characteristics are out of the normal interval of the electrical standards, the processing module 23 determines that the LED lamps 3 is in a malfunction condition, and further determines malfunction information and locations of the malfunctioning LED street lamps 3b. The control module 22 activates functions of the server 2 to give a warning and display the related malfunction information, in response to the malfunction information and location of the malfunctioning LED street lamp 3b.

In this way, the LED street lamp 3b is able to report any abnormalities to the server 2, and the server 2 is able to localize the malfunctioning lamp, so that a potential defect can be discovered and repaired in a timely manner.

In this embodiment, the storage module 24 further stores many kinds of atmospheric conditions and many specified electrical standards corresponding to each of the atmospheric conditions. The processing module 23 is further configured to read the specified electrical standards corresponding to the detected atmospheric information from the storage module 24, and determine whether the detected electrical characteristics are consistent with the specified electrical standards. If the detected electrical characteristics are not consistent with the specified electrical standards, the processing module 23 is further configured to generate a control command including the specified electrical standards. The second communication module 21 receives and sends the control command to the corresponding LED street lamp 3b.

In this way, the server 2 is able to monitor the functioning of each individual LED street lamp 3b, and switch on or switch off the LED street lamp 3b, or adjust luminance or color temperature of the light emitted by the LED street lamp 3b.

Figure 5:
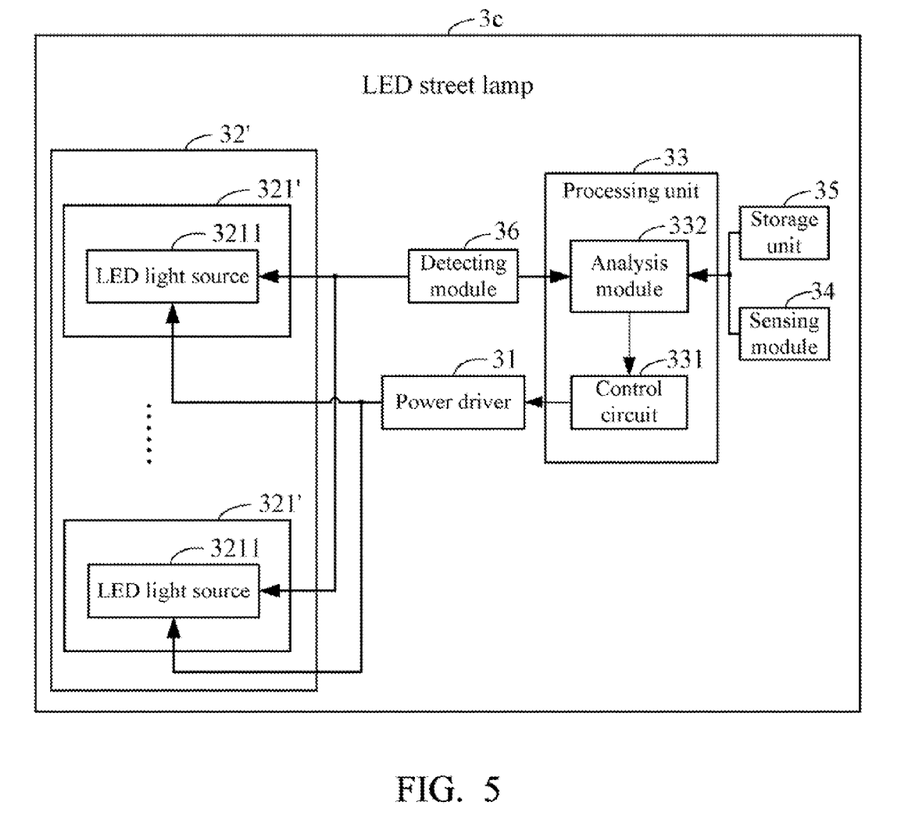
FIG. 5 is a block diagram of the LED street lamp of FIG. 1 according to a third embodiment.

In a third embodiment of the LED street lamp 3c, as shown in FIG. 5, a difference of this embodiment from the first embodiment is that the LED street lamp 3c includes a lamp board group 32' and a power driver 31. The lamp board group 32' includes a number of lamp boards 321' connected in parallel. The LED light source 3211 is distributed on each lamp board 321'. The power driver 31 is configured to drive all of the LED light sources 3211 to emit light. The control circuit 331 is connected to the power driver 3212, and is configured to control the functioning of the LED light sources 3211 via the power drivers 31.

Figure 6:
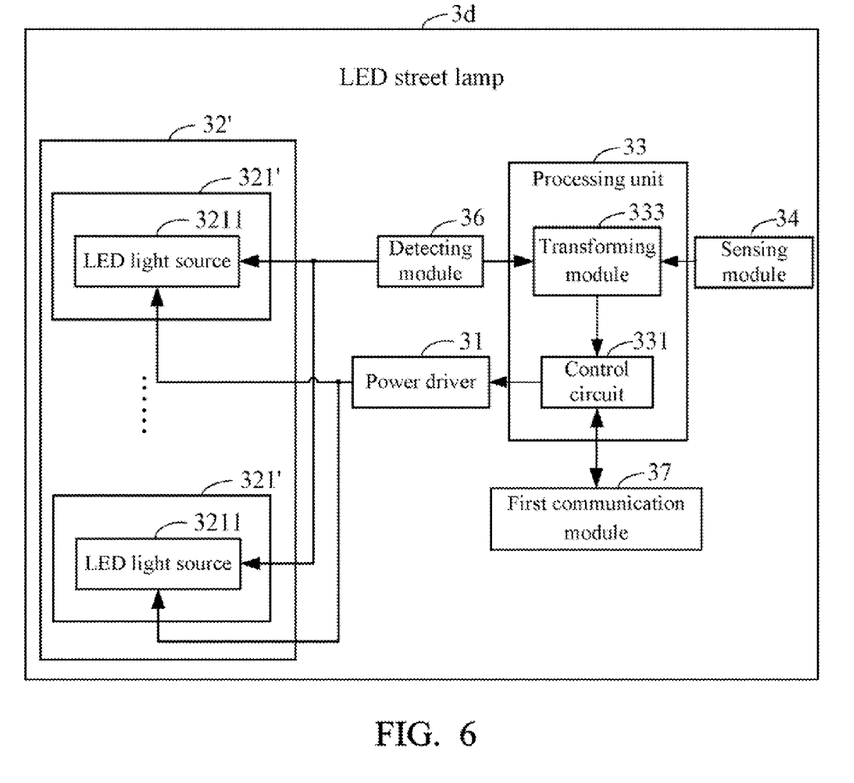
FIG. 6 is a block diagram of the LED street lamp of FIG. 1 according to a fourth embodiment.

In a fourth embodiment of the LED street lamp 3d, as shown in FIG. 6, a difference of this embodiment from the second embodiment is that the LED street lamp 3d includes the lamp board group 32' and the power driver 31. The lamp board group 32' includes a number of lamp boards 321' connected in parallel. The LED light source 3211 is distributed on each lamp board 321'. The power driver 31 is configured to drive all of the LED light sources 3211 to emit light. The control circuit 331 is connected to the power driver 3212, and is configured to control the functioning of the LED light sources 3211 via the power drivers 31.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:
1. An LED (light emitting diode) street lamp comprising:
a plurality of LED light sources connected in parallel;
a detecting module connected to each LED light source, the detecting module configured to detect the electrical characteristics of each LED light source;
a sensing module configured to detect atmospheric information of the area where the LED street lamp is located;
a storage unit configured to store a plurality of atmospheric conditions and a plurality of specified electrical standards corresponding to each of the atmospheric conditions;
an analysis module configured to receive the detected electrical characteristics from the detecting module and the detected atmospheric information from the sensing module;
the analysis module further configured to read the specified electrical standards corresponding to the detected atmospheric information from the storage unit, and generate a control command comprising the specified electrical standards, if the detected electrical characteristics are not consistent with the specified electrical characteristics; and
a control circuit configured to adjust the electrical characteristics of the LED light sources to accord with the specified electrical standards in response to the control commands.

2. The LED street lamp as described in claim 1, further comprising a plurality of power driver connected to the plurality of LED light sources correspondingly, wherein each of the power driver is configured to receive electrical power from an external source, and convert the power to a direct current supply, to drive the corresponding LED light source to emit light.

3. The LED street lamp as described in claim 1, further comprising a power driver connected to the plurality of LED light sources, wherein the power driver is configured to receive electrical power from an external source, and convert the power to a direct current supply, to drive all of the LED light sources to emit light.

4. An LED street lamp comprising:
a plurality of LED light sources connected in parallel;
a detecting module connected to each of the LED light sources, the detecting module configured to detect the electrical characteristics of each of the LED light sources;
a sensing module configured to detect atmospheric information of the area where the LED street lamp is located;
a transforming module configured to receive the detected electrical characteristics from the detecting module and the detected atmospheric information from the sensing module; the analysis module further configured to packetize a unique identification code and the detected electrical characteristics of the LED street lamp, and the detected atmospheric information together, to generate a detecting signal;
a first communication module configured to send the detecting signal to a server for analysis; the first communication module further configured to receive control commands from the server; and
a control circuit configured to adjust the electrical characteristics of the LED light sources in response to the control commands.

5. The LED street lamp as described in claim 4, further comprising a plurality of power driver connected to the plurality of LED light sources correspondingly, wherein each of the power driver is configured to receive electrical power from an external source, and convert the power to a direct current supply, to drive the corresponding LED light source to emit light.

6. The LED street lamp as described in claim 4, further comprising a power driver connected to the plurality of LED light sources, wherein the power driver is configured to receive electrical power from an external source, and convert the power to a direct current supply, to drive all of the LED light sources to emit light beams.

7. A remote intelligent monitoring system comprising a server and a plurality of LED street lamps, each of the plurality of LED street lamps comprising:
a plurality of LED light sources connected in parallel;
a detecting module connected to each of the LED light sources, the detecting module configured to detect the electrical characteristics of each of the LED light sources;
a sensing module configured to detect atmospheric information of the area where the LED street lamp is located;
a transforming module configured to receive the detected electrical characteristics from the detecting module and the detected atmospheric information from the sensing module; the analysis module further configured to packetize a unique identification code and the detected electrical characteristics of the LED street lamp, and the detected atmospheric information together, to generate a detecting signal;
a first communication module configured to send the detecting signal to the server for analysis; the first communication module further configured to receive control commands from the server; and
a control circuit configured to adjust the electrical characteristics of the LED light sources in response to the control commands.

8. The monitoring system as described in claim 7, wherein the server comprises:
a second communication module receiving the detecting signal from each LED street lamp; and
a processing module configured to parse the detecting signal to obtain the unique identification code and the detected electrical characteristics of the LED street lamp, and the atmospheric information detected by the LED street lamp.

9. The monitoring system as described in claim 8, wherein the server further comprises:
a storage module configured to store a normal value interval of the electrical standards;
the processing module is further configured to determine functioning of the LED lamps by determining whether the detected electrical characteristics in the detecting signals is in the normal interval of the electrical standards, and determine malfunction information and locations of the malfunctioning LED street lamps, if the detected electrical characteristics are out of the normal interval of the electrical standards; and
a control module configured to activate functions of the server to give a warning and display the related malfunction information, in response to the malfunction information and location of the malfunctioning LED street lamp.

10. The monitoring system as described in claim 8, wherein the server further comprises a storage module configured to store a plurality of atmospheric conditions and a plurality of specified electrical standards corresponding to each of the atmospheric conditions;
the processing module is further configured to read the specified electrical standards corresponding to the detected atmospheric information from the storage module, and generate a control command comprising the read specified electrical characteristics, if the detected electrical characteristics are not consistent with the read specified electrical characteristics; and
the second communication module further configured to send the control commands to the corresponding LED street lamp.

11. The monitoring system as described in claim 7, wherein the LED street lamp further comprises a plurality of power driver connected to the plurality of LED light sources correspondingly, wherein each of the power driver is configured to receive electrical power from an external source, and convert the power to a direct current supply, to drive the corresponding LED light source to emit light.

12. The monitoring system as described in claim 7, wherein the LED street lamp further comprises a power driver connected to the plurality of LED light sources respectively, wherein the power driver is configured to receive electrical power from an external source, and convert the power to a direct current supply, to drive all of the LED light sources to emit light.

13. The monitoring system as described in claim 7, wherein the communication technology between the first communication module and the second communication module is selected from wired technology, wireless technology, and a combination of wired technology and wireless technology.

* * * * *